(12) United States Patent
Brewster

(10) Patent No.: US 11,530,024 B2
(45) Date of Patent: Dec. 20, 2022

(54) VARIABLE WIDTH DOOR FOR COCKPIT SECONDARY BARRIER AND OTHER AIRCRAFT CABIN APPLICATIONS

(71) Applicant: AIRBUS AMERICAS, INC., Mobile, AL (US)

(72) Inventor: John A. Brewster, Daphne, AL (US)

(73) Assignee: AIRBUS AMERICAS, INC., Mobile, AL (US)

( * ) Notice: Subject to any disclaimer, the term of this patent is extended or adjusted under 35 U.S.C. 154(b) by 241 days.

(21) Appl. No.: 17/013,970

(22) Filed: Sep. 8, 2020

(65) Prior Publication Data

US 2022/0073184 A1     Mar. 10, 2022

(51) Int. Cl.
*B64C 1/14*     (2006.01)
*B64C 1/10*     (2006.01)
*E05C 1/04*     (2006.01)
*E05C 7/00*     (2006.01)

(52) U.S. Cl.
CPC .............. *B64C 1/1469* (2013.01); *B64C 1/10* (2013.01); *B64C 1/1461* (2013.01); *E05C 1/04* (2013.01); *E05C 7/00* (2013.01); *E05C 2007/007* (2013.01); *E05Y 2900/502* (2013.01); *E05Y 2900/531* (2013.01)

(58) Field of Classification Search
CPC ....... B64C 1/1469; B64C 1/10; B64C 1/1461; E05C 1/04; E05C 7/00; E05C 2007/007; E05Y 2900/502; E05Y 2900/531
See application file for complete search history.

(56) References Cited

U.S. PATENT DOCUMENTS

| 6,474,599 B1 * | 11/2002 | Stomski | B64C 1/1469 109/69 |
| 6,769,646 B1 * | 8/2004 | Komiyama | B64C 1/1469 244/129.1 |

(Continued)

FOREIGN PATENT DOCUMENTS

| EP | 2 711 295 A2 | 3/2014 |
| GB | 2 041 051 A | 9/1980 |
| KR | 101946873 B1 | 2/2019 |

OTHER PUBLICATIONS

European Search Report for Application No. 21193634 dated Jan. 18, 2022.

*Primary Examiner* — Rodney A Bonnette
(74) *Attorney, Agent, or Firm* — Jenkins, Wilson, Taylor & Hunt, P.A.

(57) ABSTRACT

An aircraft is equipped with an auxiliary access control barrier (AACB) to prevent access to an area of the aircraft. The AACB includes laterally extendable door panels that are slidably attached to each other to vary a width of the AACB, a hinge by which the door panels are pivotably attached to the aircraft, such that the door panels are pivotable between a deployed position, in which the door panels are positioned across the opening to prevent passage through the opening and in which the AACB has a first width, and a stowed position, in which the door panels are positioned to allow passage through the opening and in which the AACB has a second width, and one or more locks to prevent relative motion between the door panels to fix the width of the AACB and/or to secure the AACB within the opening in the bulkhead.

17 Claims, 10 Drawing Sheets

(56) References Cited

U.S. PATENT DOCUMENTS

| | | | |
|---|---|---|---|
| 2003/0071743 A1* | 4/2003 | Seah | B64D 45/0026 |
| | | | 340/945 |
| 2006/0000946 A1 | 1/2006 | Garofani et al. | |
| 2018/0265216 A1* | 9/2018 | Breigenzer | E05B 81/70 |
| 2018/0346091 A1 | 12/2018 | Movsesian et al. | |
| 2020/0347656 A1* | 11/2020 | Groninga | B64C 1/1438 |

* cited by examiner

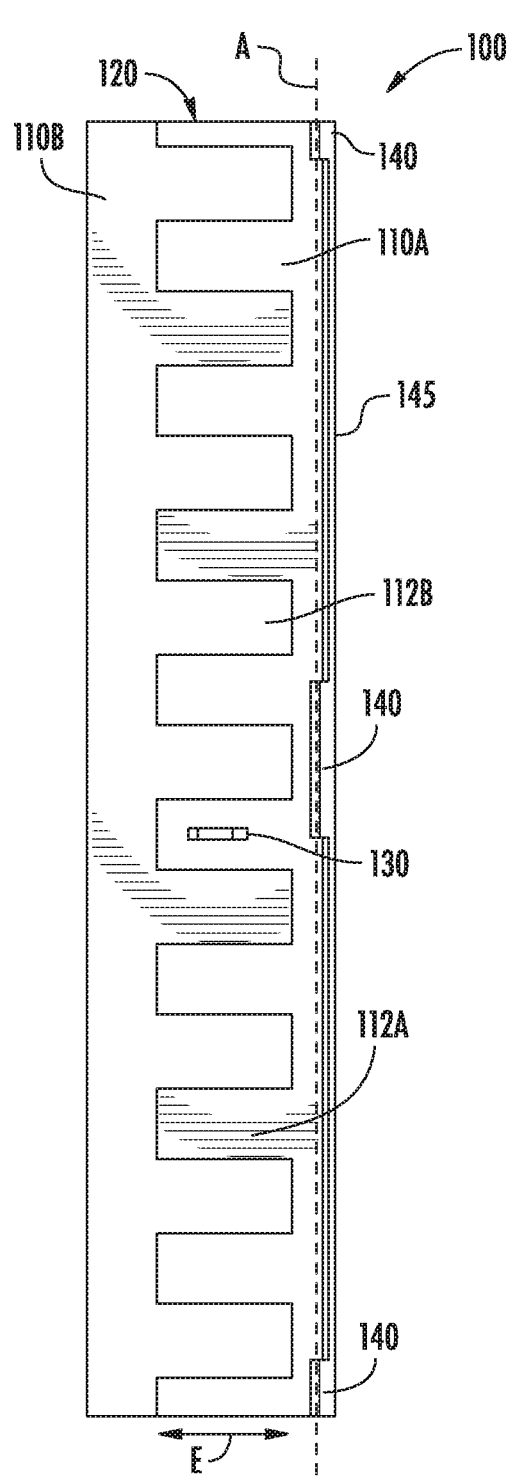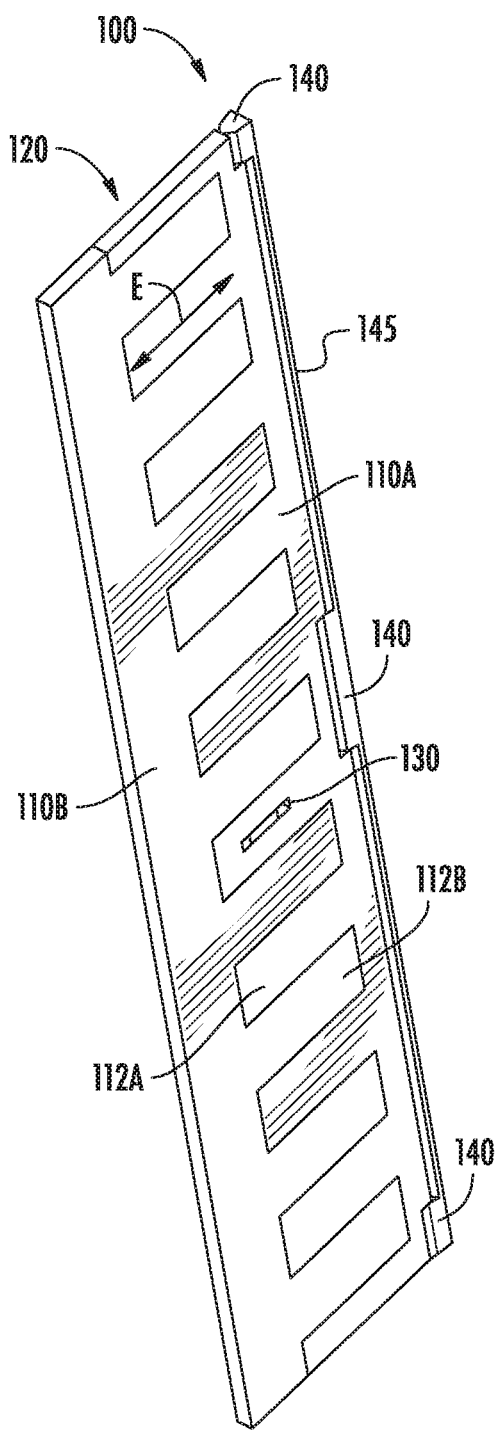
FIG. 4A
FIG. 4B

VARIABLE WIDTH DOOR FOR COCKPIT SECONDARY BARRIER AND OTHER AIRCRAFT CABIN APPLICATIONS

TECHNICAL FIELD

The disclosure herein relates generally to an aircraft interior. In particular, the disclosure herein relates to providing a secondary barrier to the cockpit of an aircraft to meet pending aircraft regulations.

BACKGROUND

It is expected to become a requirement for a secondary barrier to be installed within commercial aircraft to prevent direct access to the cockpit from the passenger compartment when the cockpit door is opened.

Traditional aircraft interior cabin doors typically have a monolithic construction (e.g., are constructed in a unitary manner). Due to their monolithic construction, such doors require a space envelope defining their travel path that is proportional to the overall width to allow for movement and/or storage of such doors. Thus, it is generally a requirement for operation of the door, whether opened, closed, stored, or in motion between the opened and closed positions, to maintain the area in which the door may be positioned during such movements and/or positions free of obstructions. Additionally, such doors of monolithic construction are typically opaque, precluding persons on one side of the door from being situationally aware of persons, objects, and/or events located and/or occurring on the opposite side of the door.

As such, a need exists for an interior door suitable for use as a movable secondary barrier to prevent passenger access to the cockpit when the cockpit door is opened during flight that addresses deficiencies associated with doors of known construction techniques.

SUMMARY

Although some of the aspects and details described above have been described in relation to the preventing unauthorized access to the cockpit during flight, these aspects may also be implemented elsewhere in other areas of the aircraft or any other suitable type vehicle. Furthermore, the features of the door described should not be regarded as stand-alone features. Rather, all features disclosed herein may be combined with an arbitrary number of other described features.

According to an example embodiment, an auxiliary access control barrier (AACB) for installation within an opening formed in a bulkhead within an aircraft fuselage is provided, the AACB comprising: laterally extendable door panels that are slidably attached to each other to vary a width of the AACB; a hinge by which the door panels are pivotably attached to the bulkhead by one or more of the door panels, such that the door panels are pivotable between a deployed position, in which the door panels are positioned across the opening to prevent passage through the opening and in which the AACB has a first width, and a stowed position, in which the door panels are positioned to allow passage through the opening and in which the AACB has a second width, wherein the first width is greater than the second width; and one or more locks configured to prevent relative motion between the door panels to fix the width of the AACB and/or to secure the AACB within the opening in the bulkhead.

In some embodiments of the AACB, the door panels comprise a first door panel and a second door panel; the first door panel comprises fingers that interlock with fingers of the second door panel in an alternating manner in a direction of a height of the AACB; and when the fingers of the second door slide in a lateral direction, orthogonal to the vertical direction, relative to the fingers of the first door panel to vary the width of the AACB, a first row of viewports are opened between adjacent fingers of the first door panel and a second row of viewports are opened between adjacent fingers of the second door panel.

In some embodiments of the AACB, viewports of the first and second rows of viewports are configured such that events occurring on an opposite side of the AACB are observable through one or more of the viewports without moving the AACB from the deployed position.

In some embodiments of the AACB, the fingers of the first door panel comprise a profile formed protruding out from upper and lower vertical surfaces thereof, the fingers of the second door panel comprise a recessed channel formed internal to upper and lower surfaces thereof, and wherein each recessed channel is configured such that a profile can be longitudinally inserted therein to secure the first and second door panels together.

In some embodiments of the AACB, the first and second door panels comprise a minimum overlap distance necessary for maintaining structural rigidity of the AACB sufficient to resist passage through the opening, and wherein the AACB is laterally extendable between a minimum width and a maximum width, the maximum width corresponding to the minimum overlap distance.

In some embodiments of the AACB, the one or more locks are recessed within one or more of the fingers of the first door panel, wherein an adjacent finger of the second door panel has a latch plate attached thereto, and wherein the one or more locks are configured to extend into the latch plate to prevent relative movement of the first door panel relative to the second door panel to fix the AACB at one of a plurality of widths between and including the minimum width and the maximum width.

According to another example embodiment, a method of controlling access to an area within an aircraft fuselage is provided, the method comprising: providing a bulkhead within the fuselage, the bulkhead having an opening formed therein; and attaching an auxiliary access control barrier (AACB) adjacent and/or within the opening of the bulkhead, the AACB comprising laterally extendable door panels, a hinge by which the door panels are pivotably attached within the opening of the bulkhead, and one or more locks; sliding the door panels relative to each other to vary a width of the AACB; engaging the one or more locks to prevent relative motion between the door panels and fix the width of the AACB; and pivoting the AACB between and including a deployed position, in which the door panels are positioned across the opening to prevent passage through the opening and in which the AACB has a first width, and a stowed position, in which the door panels are positioned to allow passage through the opening and in which the AACB has a second width, wherein the first width is greater than the second width.

In some embodiments of the method, the door panels comprise a first door panel and a second door panel; the first door panel comprises fingers that interlock with fingers of the second door panel in an alternating manner in a direction of a height of the AACB; the method comprising: sliding the fingers of the second door in a lateral direction, orthogonal to the vertical direction, relative to the fingers of the first door panel to vary the width of the AACB to open a first row of viewports between adjacent fingers of the first door panel and a second row of viewports between adjacent fingers of the second door panel.

In some embodiments of the method, viewports of the first and second rows of viewports are configured such that events occurring on an opposite side of the AACB are observable through one or more of the viewports without moving the AACB from the deployed position.

In some embodiments of the method, the fingers of the first door panel comprise a profile formed protruding out from upper and lower vertical surfaces thereof, the fingers of the second door panel comprise a recessed channel formed internal to upper and lower surfaces thereof, and wherein each recessed channel is configured such that a profile can be longitudinally inserted therein to secure the first and second door panels together.

In some embodiments of the method, the first and second door panels comprise a minimum overlap distance necessary for maintaining structural rigidity of the AACB sufficient to resist passage through the opening, and wherein the AACB is laterally extendable between a minimum width and a maximum width, the maximum width corresponding to the minimum overlap distance.

In some embodiments of the method, the one or more locks are recessed within one or more of the fingers of the first door panel, wherein an adjacent finger of the second door panel has a latch plate attached thereto, and wherein the one or more locks extend into the latch plate to prevent relative movement of the first door panel relative to the second door panel to fix the AACB at one of a plurality of widths between and including the minimum width and the maximum width.

In some embodiments of the method, the opening in the bulkhead of the aircraft is at a forward portion of aircraft fuselage, within a passenger cabin of the aircraft and adjacent to a cockpit door, the AACB being installed within the opening to prevent unauthorized access to a cockpit of the aircraft from the passenger cabin.

According to another example embodiment, an aircraft is provided, the aircraft comprising: an aircraft fuselage; a bulkhead secured within the fuselage, the bulkhead having an opening formed therein; and at least one auxiliary access control barrier (AACB) adjacent to the opening of the bulkhead, the AACB comprising: laterally extendable door panels that are slidably attached to each other to vary a width of the AACB, a hinge by which the door panels are pivotably attached to the bulkhead by one or more of the door panels, such that the door panels are pivotable between a deployed position, in which the door panels are positioned across the opening to prevent passage through the opening and in which the AACB has a first width, and a stowed position, in which the door panels are positioned to allow passage through the opening and in which the AACB has a second width, wherein the first width is greater than the second width, and one or more locks configured to prevent relative motion between the door panels to fix the width of the AACB and/or to secure the AACB within the opening in the bulkhead.

In some embodiments of the aircraft, the door panels comprise a first door panel and a second door panel; the first door panel comprises fingers that interlock with fingers of the second door panel in an alternating manner in a direction of a height of the AACB; and, when the fingers of the second door slide in a lateral direction, orthogonal to the vertical direction, relative to the fingers of the first door panel to vary the width of the AACB, a first row of viewports are opened between adjacent fingers of the first door panel and a second row of viewports are opened between adjacent fingers of the second door panel.

In some embodiments of the aircraft, viewports of the first and second rows of viewports are configured such that events occurring on an opposite side of the AACB are observable through one or more of the viewports without moving the AACB from the deployed position.

In some embodiments of the aircraft, the fingers of the first door panel comprise a profile formed protruding out from upper and lower vertical surfaces thereof, the fingers of the second door panel comprise a recessed channel formed internal to upper and lower surfaces thereof, and wherein each recessed channel is configured such that a profile can be longitudinally inserted therein to secure the first and second door panels together.

In some embodiments of the aircraft, the first and second door panels comprise a minimum overlap distance necessary for maintaining structural rigidity of the AACB sufficient to resist passage through the opening, and wherein the AACB is laterally extendable between a minimum width and a maximum width, the maximum width corresponding to the minimum overlap distance.

In some embodiments of the aircraft, the one or more locks are recessed within one or more of the fingers of the first door panel, wherein an adjacent finger of the second door panel has a latch plate attached thereto, and wherein the one or more locks are configured to extend into the latch plate to prevent relative movement of the first door panel relative to the second door panel to fix the AACB at one of a plurality of widths between and including the minimum width and the maximum width.

In some embodiments of the aircraft, the opening in the bulkhead of the aircraft is at a forward portion of aircraft fuselage, within a passenger cabin of the aircraft and adjacent to a cockpit door, the AACB being installed within the opening to prevent unauthorized access to a cockpit of the aircraft from the passenger cabin.

Further features, properties, advantages and possible derivations will be evident to the person skilled in the art from the description below which refers to the attached, example drawings. All features described and/or depicted in the drawings, alone or in arbitrary combinations, indicate the object disclosed herein. The dimensions and proportions of the components shown in the figures are not to scale.

BRIEF DESCRIPTION OF THE DRAWINGS

The disclosure herein will be explained in more detail with reference to figures. The example figures referenced below illustrate schematically:

FIGS. 4A and 4B are isolated views, showing the auxiliary access control barrier of FIGS. 1-3 in the retracted position;

DETAILED DESCRIPTION

In the description below, without being restricted hereto, specific details are presented in order to give a complete understanding of the disclosure herein. It is, however, clear to a person skilled in the art that the disclosure herein may be used in other example embodiments which may differ from the details outlined below. The figures serve furthermore merely to illustrate example embodiments, are not to scale, and serve merely to illustrate by example the general concept of the disclosure herein. For example, features contained in the figures must not necessarily be considered to be essential components.

Comparable or identical components and features, or those with similar effect, carry the same reference signs in the figures. For reasons of clarity, in the figures sometimes the reference signs of individual features and components have been omitted, wherein these features and components carry reference signs in the other figures.

The variable width door would allow for a traditional door functionality in regard to crew handling in a package that allows for stowage in very tight constraints. The area aft of the A320 cockpit door is framed by a galley and a lavatory monument. In some cases, this is the only practical area to attach a door to isolate the cockpit door from the passenger cabin (the idea of the secondary barrier). A fixed width door could not be used here due to the space constraints. A variable width door can fit. For other installation scenarios (i.e., other aircraft types and monument scenarios), the variable width door can still provide an attractive solution owing to the inherent secondary function to provide visibility through the open portions of the door when deployed. The variable width also means that a single door configuration (variable width range x to y) can fit a variety of aisle widths, reducing the range of different part numbers required to fulfil all scenarios on different fleets and cabin configurations.

The door panel halves are interlocking pieces. They are fixed to each other by tracks or other similar hardware that allows them to move relative to each other within a limited range of motion. The motion between the two door halves is limited to a maximum opening dimension. The two door halves can be locked in all positions between fully closed and fully opened by a lock or locking mechanism, actuated by a lock/unlock manual handle. This handle may also incorporate a time-delay feature to provide for cabin crew reaction time in the event of an unauthorized attempt to open.

In the retracted (minimum width) position, the door can be rotated against the hinge attach surface (galley, lavatory, etc.) and fixed to the monument wall for stowage.

Figure 1:
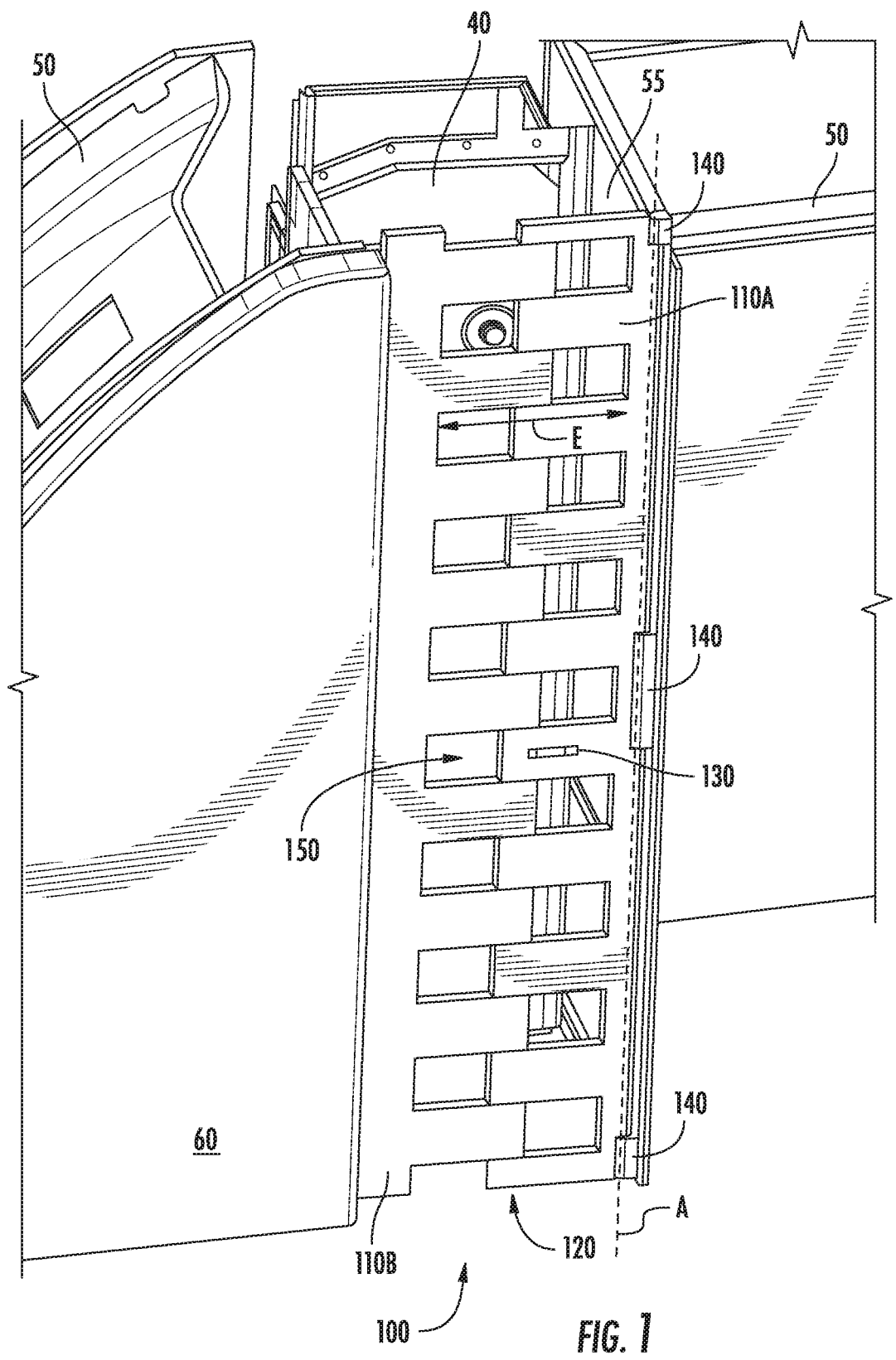
FIG. 1 is a perspective view of an auxiliary access control barrier (AACB) installed within an aircraft and/or aircraft fuselage, in which the auxiliary access control barrier is in the closed position.
Figure 2:
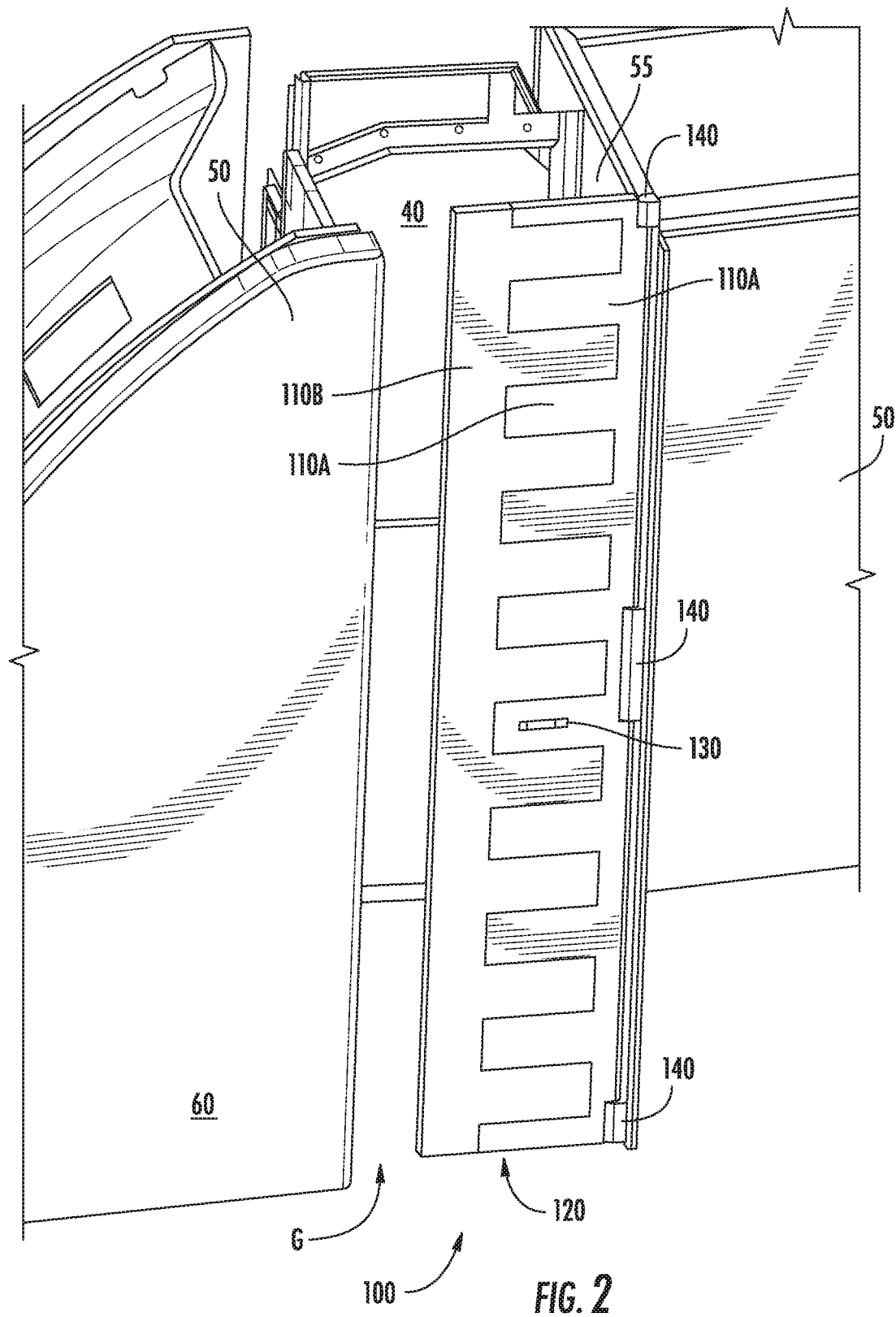
FIG. 2 is a perspective view of the auxiliary access control barrier of FIG. 1 in a retracted, movable position.
Figure 3:
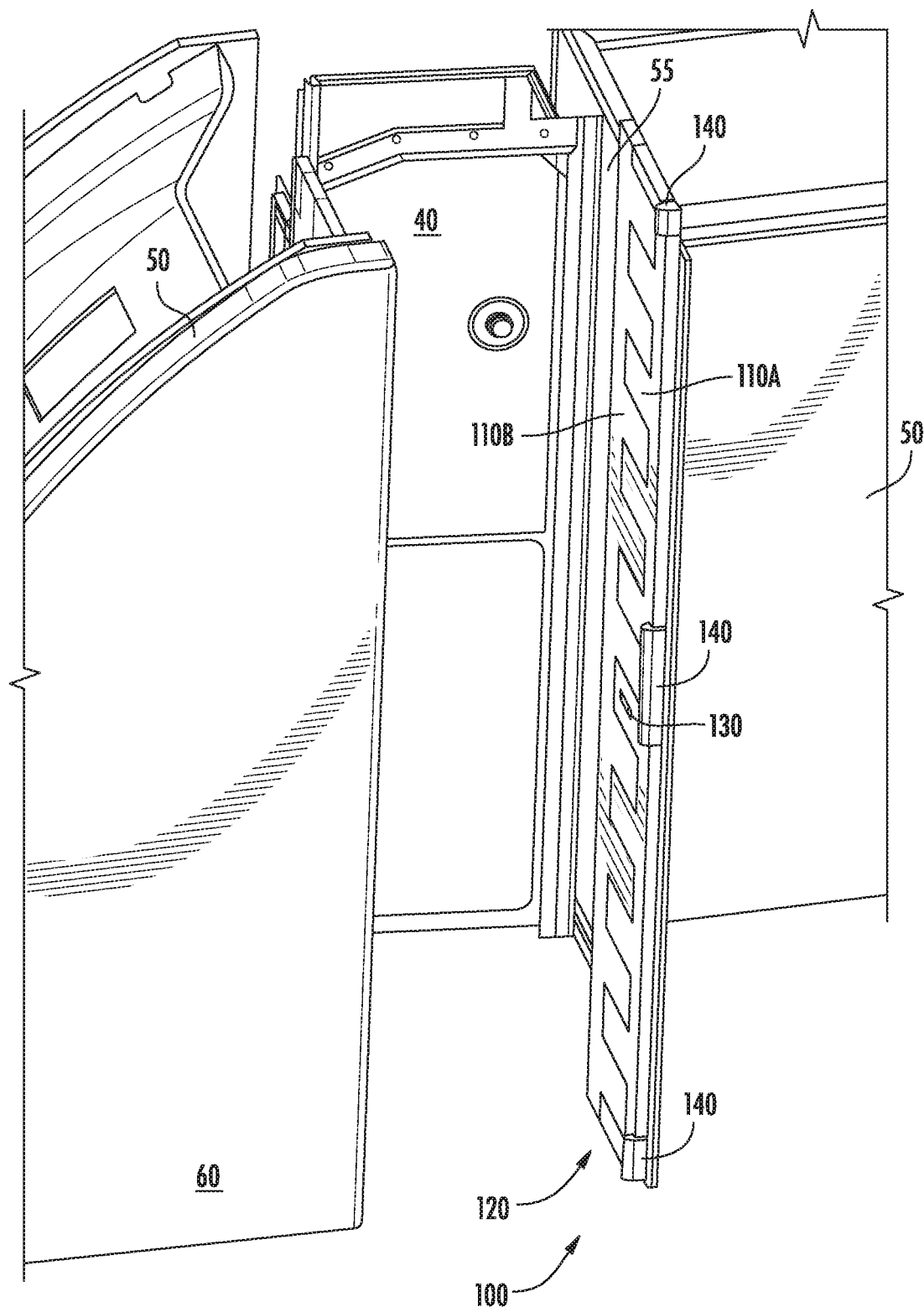
FIG. 3 is a perspective view of the auxiliary access control barrier of FIGS. 1 and 2 in an open, stored position.
Figure 10:
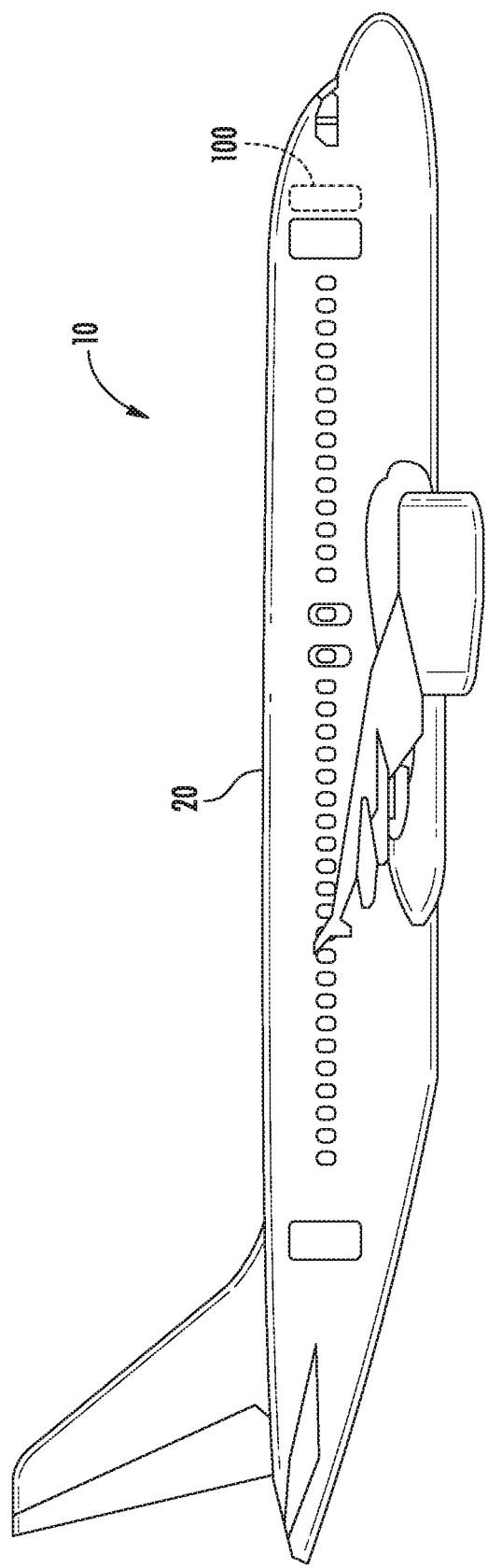
FIG. 10 is a side view of an aircraft, in which such an auxiliary access control barrier disclosed elsewhere herein is provided.

FIGS. 1 through 3 are perspective views of a laterally-expandable auxiliary access control barrier (AACB), generally designated 100, which is sometimes referred to as a "secondary barrier" in the aviation industry generally, in the expanded, locked position (FIG. 1), in the retracted, unlocked position (FIG. 2), and in the retracted, stowed position (FIG. 3). The AACB 100 is shown in FIGS. 1 through 3 installed at the forward portion of an aircraft (10, FIG. 10), within an aircraft fuselage (20, FIG. 10), in a position to be configured to prevent passage through an opening formed in a bulkhead 50 of the aircraft fuselage 20, adjacent to the cockpit door 40 of the aircraft 10. The AACB 100 is formed by two laterally-expandable door panels 110A, 110B. While any laterally-expandable construction may be considered to be within the scope of the instant disclosure, the presently disclosed example embodiment is considered advantageous.

The AACB 100 has a first door panel 110A, which is hingedly (e.g., rotatably and/or pivotably) attached to the bulkhead 50 at a lateral edge of the opening formed through the bulkhead 50. The hinges 140 can be separable or fixedly attached to the first door panel 110A. In some embodiments, the hinges 140 are fixedly attached to the bulkhead 50, for example, by a plurality of fasteners, with the first door panel 110A then being removably mountable to the hinges 140 and, thusly, the bulkhead 50. In the example embodiment shown, the AACB 100 includes three hinges 140, however, any number of hinges 140 may be provided, accounting for the dimensions and mass of the door panels 110A, 110B, as well as the desired connection points to the bulkhead 50 to ensure sufficient rigidity and/or security of the AACB 100 to prevent unauthorized passage therethrough (e.g., by physically breaking down the AACB 100 due to mechanical failure of the hinges 140.)

Regardless of how the first door panel 110A is attached to the bulkhead 50, the hinges 140 define an axis of rotation A about which the first door panel 110A, as well as the second door panel 110B attached thereto, pivots between the closed position, in which the opening through the bulkhead 50 is at least partially obstructed, and the stowed position, in which the opening through the bulkhead 50 is substantially unobstructed. The term "substantially unobstructed" means, as used herein, that the thickness of the door panels 110A, 110B and/or the lateral protrusion of the hinges 140 into the opening, whichever is greater, will at least always be present to block that portion of the opening even when the AACB 100 is in the stowed position. It can be advantageous to have the AACB 100 against a sidewall 55 of the aircraft fuselage 20 when in the stowed position When viewed along the axis of rotation A, the first door panel 110A is located radially inwardly from the second door panel 110B, which is laterally-expandable in the radial direction, again, as viewed along the axis of rotation A. As the second door panel 110B is laterally extended away from, or retracted towards, the first door panel 110A, the AACB 100 remains substantially planar (e.g., allowing for nonplanarities due to tolerances between the sliding surfaces). In the example embodiment shown, the first and second door panels 110A, 110B are substantially planar, however, the first and second door panels 110A, 110B may have a curved profile of a same, or substantially similar, radius, such that the AACB 100 comprises a laterally-extendable door having a curved profile.

Figure 8A:
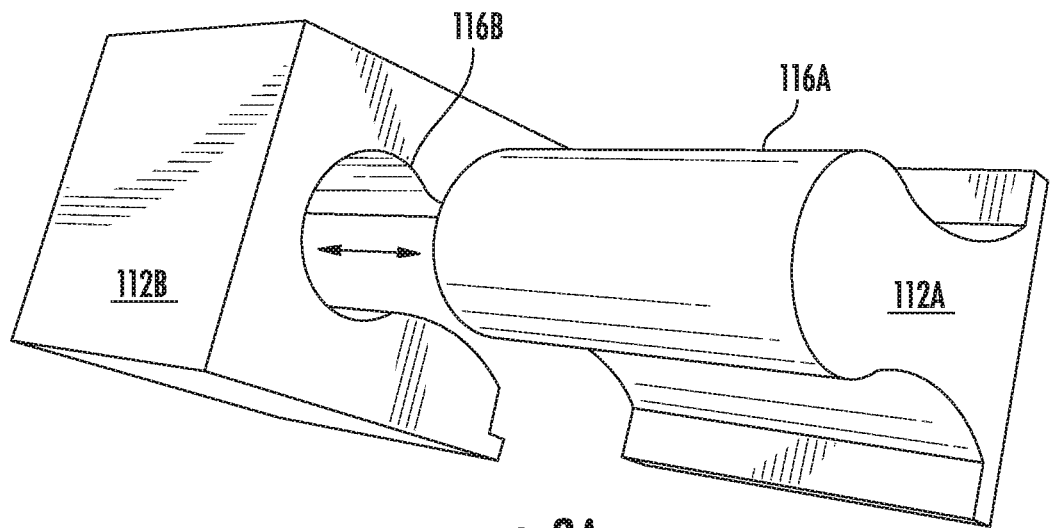
FIGS. 8A and 8B are perspective views showing the sliding interface between the movable door panels of the auxiliary access control barrier of FIGS. 1 through 3.
Figure 8B:
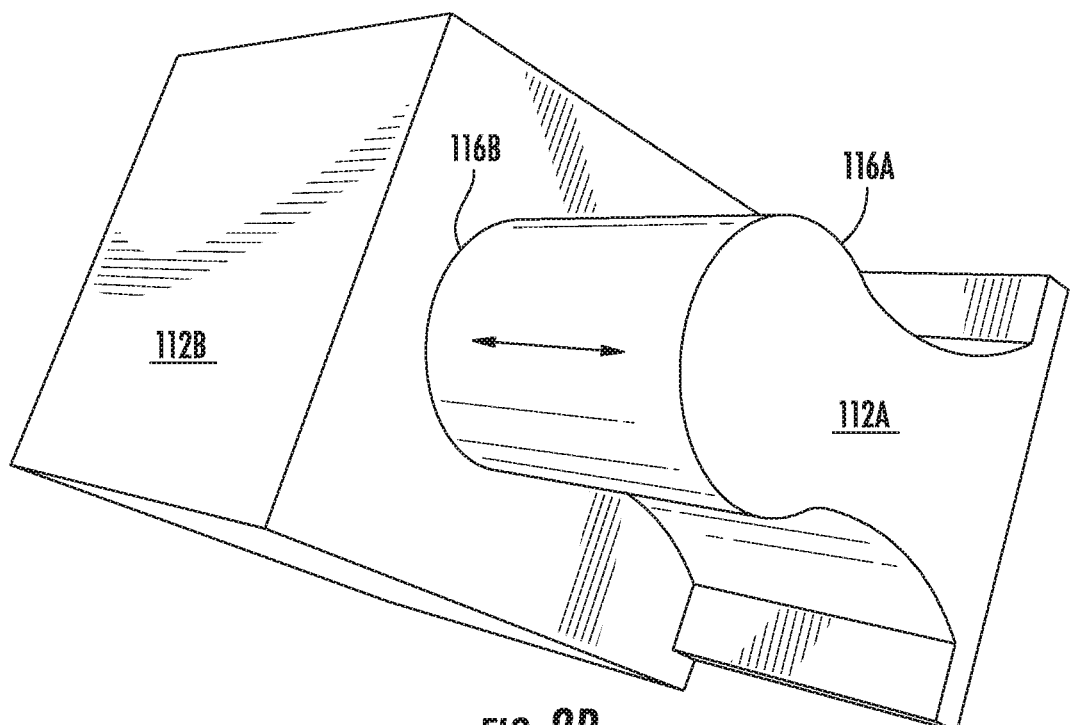

The AACB 100 has an expansion zone, generally designated 120, in which the second door panel 110B is movable relative to the first door panel 110A, such that the width of the AACB 100 is variable. The expansion zone 120 defines the maximum distance by which the first and second door panels 110A, 110B can slide, relative to each other, in the direction of expansion E to vary the width of the AACB 100. Each of the first and second door panels 110A, 110B have fingers 112A, 112B, respectively, that interlock with each other to form a sliding interface for the AACB 100. Examples of the sliding interfaces between the fingers 112A, 112B of the first and second door panels 110A, 110B are shown in FIGS. 8A and 8B.

In the example embodiment shown, the fingers 112A of the first door panel 110A has a profile 116A, here, in the shape of an omega, and the fingers 112B of the second door panel 110B have a recessed channel 116B, which is shaped complementary to the shape of the profile 116A, such that the profile 116A is capable of freely sliding in the direction indicated by the arrow, along the length of the recessed channel 116B, to vary a width of the AACB 100 to allow the AACB 100 to be installed in any opening through a bulkhead 50 that is within a range of the minimum and maximum width values at which the first and second door panels 110A, 110B can be secured together.

A lock 130 is provided in one or more of the fingers 112A, 112B to lock the door panels 110A, 110B together and prevent relative motion between the door panels 110A, 110B. The locks shown herein are examples and the scope of the subject matter disclosed herein is not limited thereto. As shown, the AACB 100 has securing locks 130A and expansion locks 130B. The securing locks 130A are used to secure the AACB 100 within the opening in the bulkhead 50 to prevent unauthorized passage through the opening. The expansion locks 130B are used to positionally fix the first and second door panels 110A, 110B together, to thereby fix the width of the AACB 100 at a desired value.

Figure 9A:
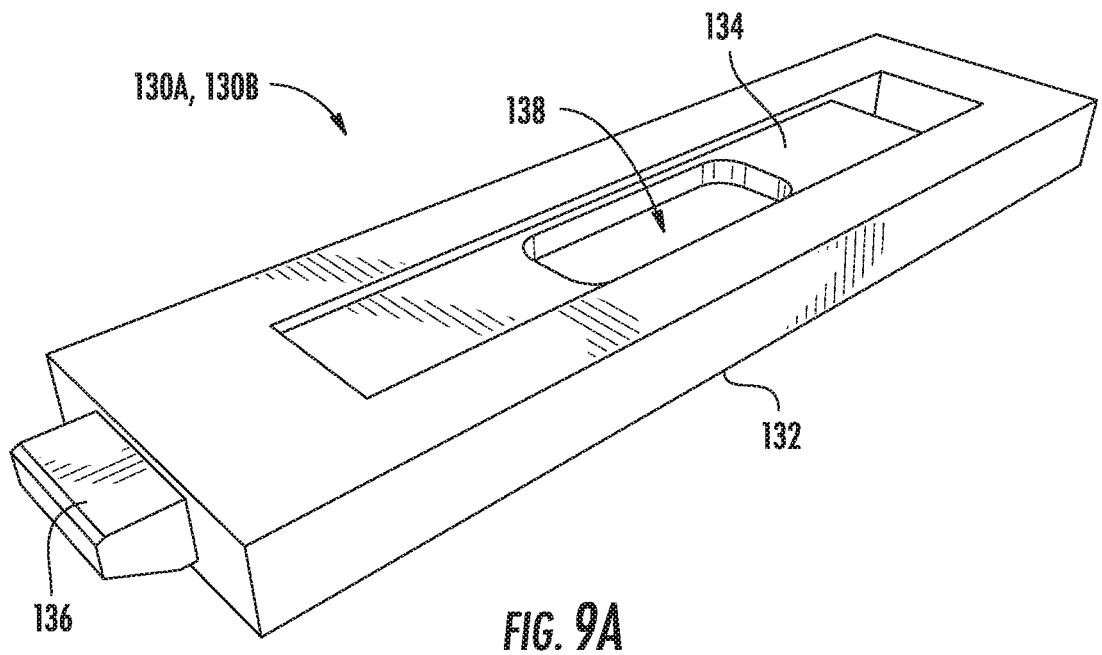
FIGS. 9A and 9B are perspective views showing the latches that secure the auxiliary access control barrier of FIGS. 1 through 3 in a closed position.
Figure 9B:
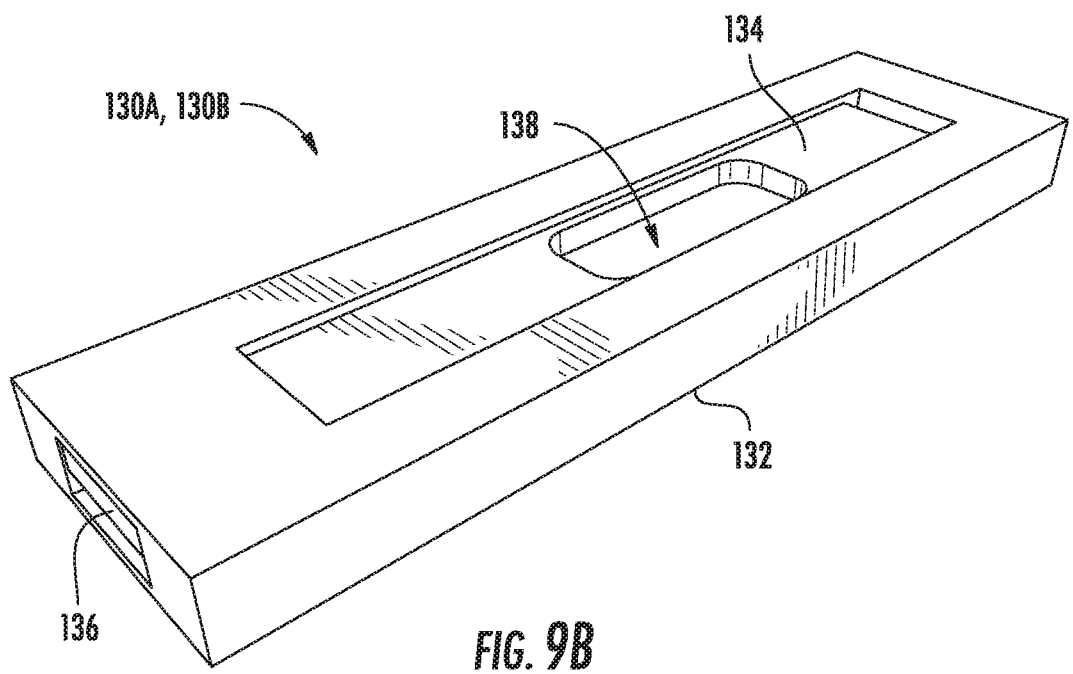

As shown in FIGS. 9A and 9B, the locks 130A, 130B are of a same construction, but it is possible to use different types of locking and/or latching mechanisms for the securing locks 130A than the expansion locks 130B. The locks 130A, 130B have a housing 132 that can be integrally formed in, or attached within a recess of, one of the fingers 112A, 112B, of the first or second door panels 110A, 110B. A slider 134 is slidably retained within the housing 132 (e.g., within a channel formed therein) and has a tongue 136 attached to a distal end that extends beyond the housing 132, when the securing locks 130A and the expansion locks 130B, respectively, are in a locked configuration, to interface with and latch within a latch plate 131. The slider 134 has a finger recess 138 which allows the slider 134 to be moved to retract the tongue 136 within the housing 132.

Figure 7:
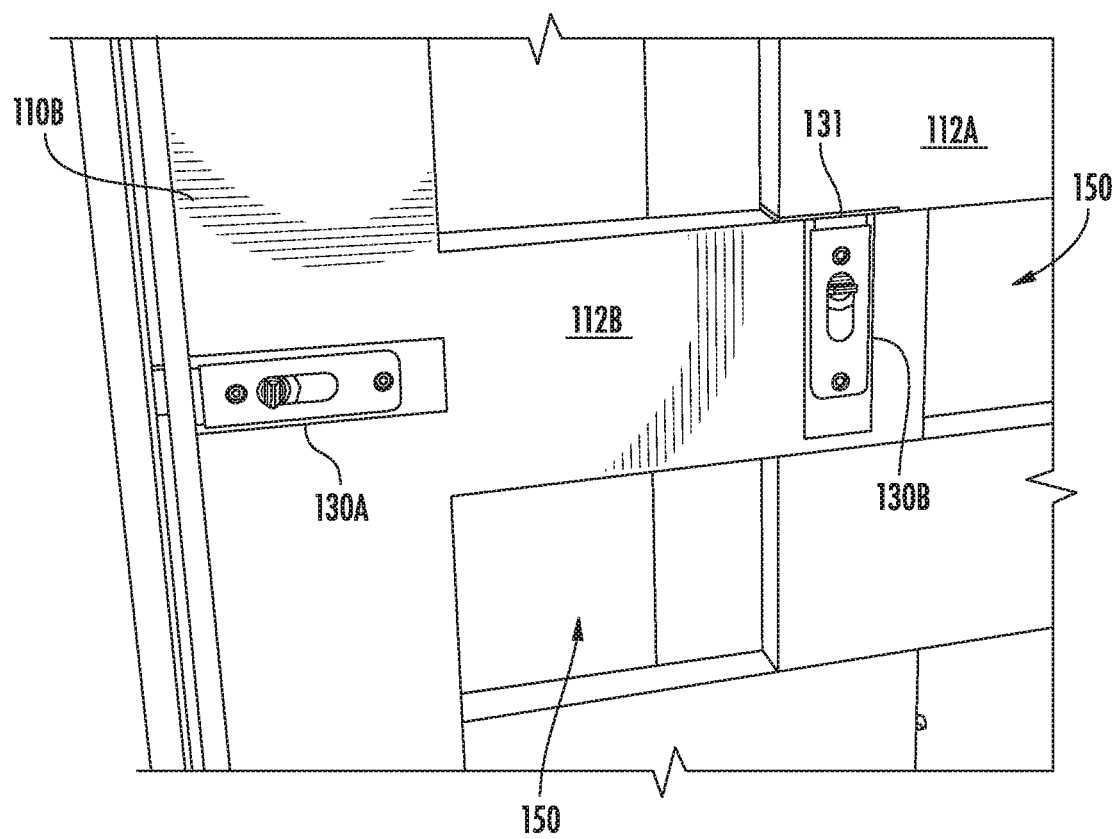
FIG. 7 is a detailed view showing aspects of the auxiliary access control barrier of FIGS. 1 through 3.

As shown in FIG. 7, the expansion lock 130B is engaged within a latch plate 131, such that the second door panel 110B cannot slide relative to the first door panel 110A, thereby fixing the width of the AACB 100, the width of the AACB 100 substantially corresponding to a width of the opening in the bulkhead 50. As used herein, the term "substantially corresponding to a width of the opening" means that the AACB 100 has a width such that the securing lock 130A can lockingly engage with a locking plate on the frame of the opening of the bulkhead 50 to secure the AACB 100 in the closed position. The fingers 112A, 112B of the first and second door panels 110A, 110B can have latch plates 131 discretely attached along the length thereof, in the expansion zone 120. In some embodiments, the latch plate 131 can be a continuous strip with holes formed therein along the length of the latch plate 131, into which the tongue 136 of the expansion lock 130B is insertable, such that the width of the AACB 100 is determined by which hole of the latch plate 131 the tongue 136 of the expansion lock 130B is inserted within. As such, each hole along the length of the latch plate 131 corresponds to a designated width of the AACB 100.

Figure 5A:
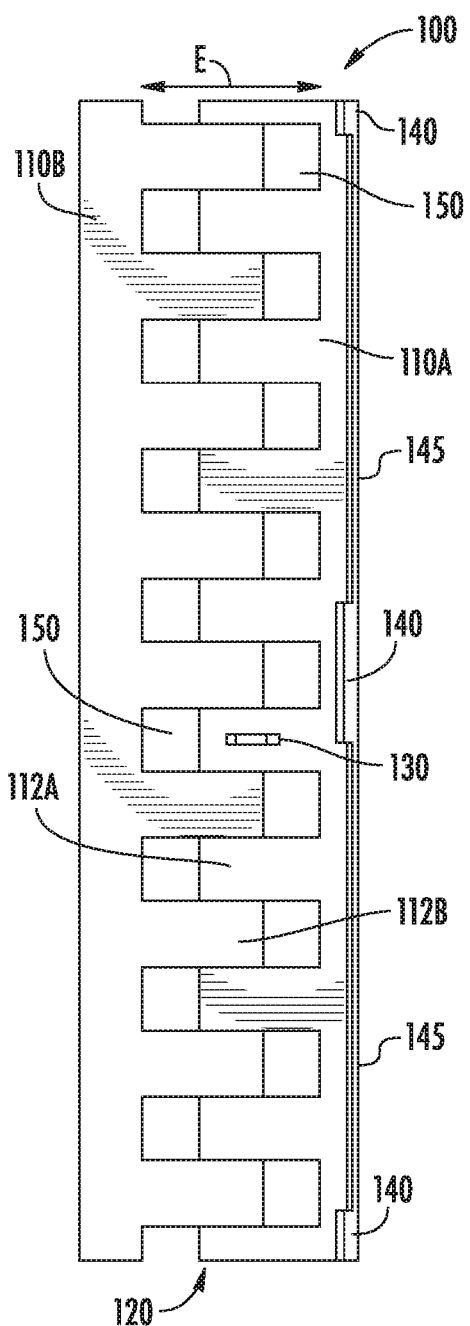
FIGS. 5A and 5B are isolated views, showing the auxiliary access control barrier of FIGS. 1 through 3 in the intermediate position.
Figure 5B:
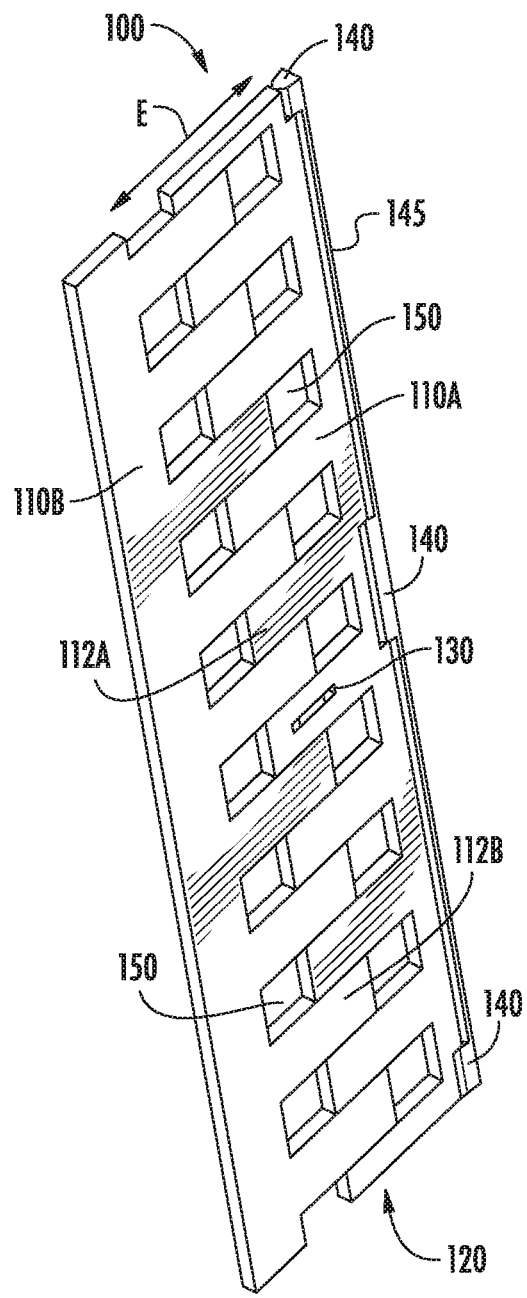
Figure 6:
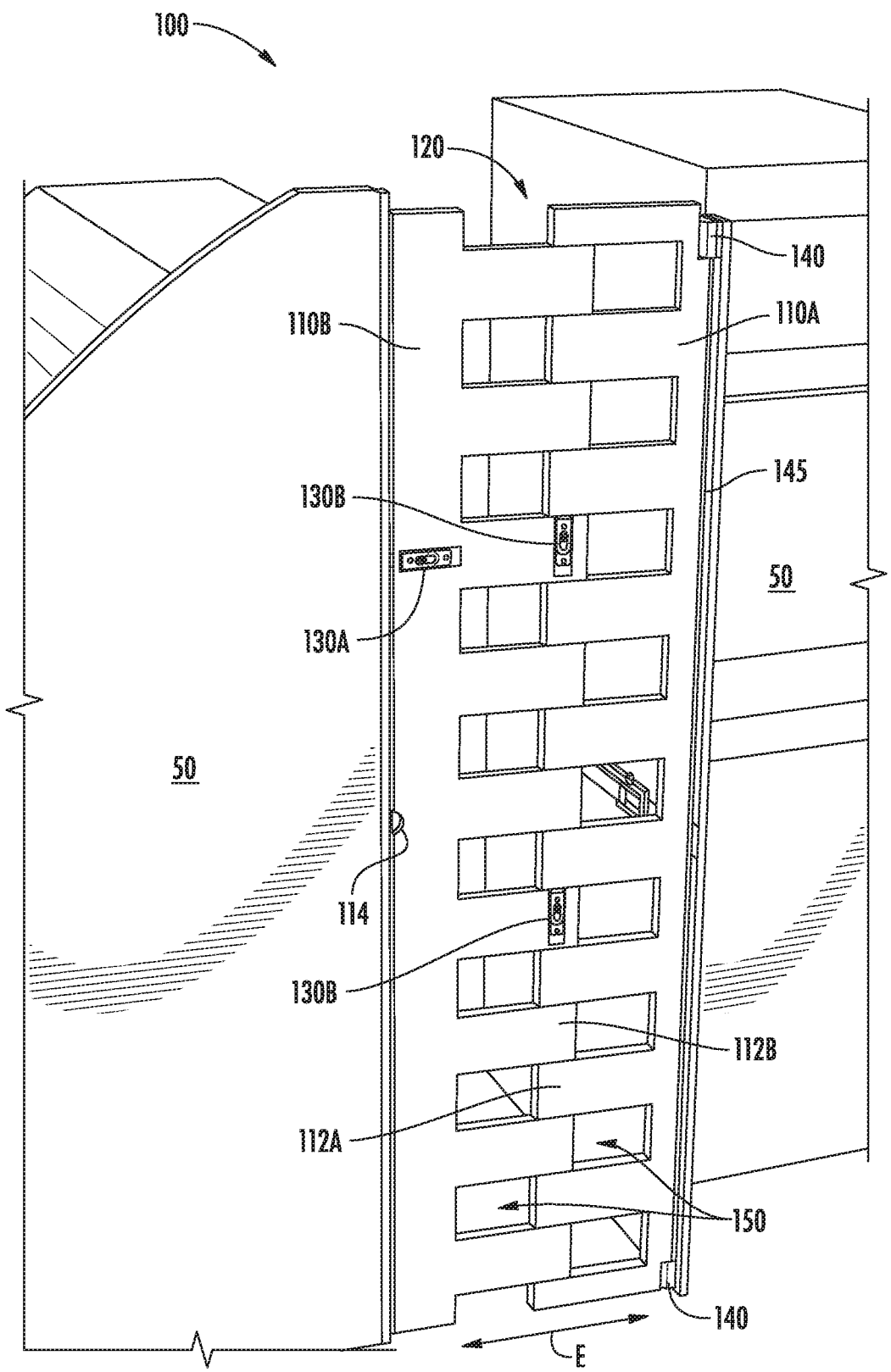
FIG. 6 is a simplified perspective view of the auxiliary access control barrier of FIGS. 1 through 3 in the closed, extended position.

Due to the interwoven, or interleaved, configuration of the fingers 112A, 112B of the first and second door panels 110A, 110B, when the first and second door panels 110A, 110B are expanded, as shown in FIGS. 5A and 5B, viewports 150 are created, as shown in FIGS. 5A through 7. By virtue of these viewports 150, it is possible for persons on either side of the AACB 100 to observe what is occurring on the other side of the AACB 100 when in the closed position without requiring the AACB 100 to be opened. This is advantageous to allow flight crew to ensure that no passengers are in the vicinity of the AACB 100 before opening the cockpit door 40 in order to deter any unauthorized access to the cockpit by passengers.

FIGS. 4A and 4B show the AACB 100 in the retracted position, in which fingers 112A, 112B of the first and second door panels 110A, 110B are fully engaged with each other, such that the AACB 100 is substantially solid. When the AACB 100 is not to be deployed, the first and second door panels 110A, 110B are fully retracted into the position shown in FIGS. 4A and 4B so that the AACB 100 is at its minimum width, then the AACB 100 is pivoted by the hinge 140 about the axis of rotation A and stowed (e.g., by a latch) flush against a surface of the aircraft fuselage interior. As such, the width of the AACB 100 when in the stowed position is less than the width of the AACB 100 when in the closed, or deployed, position. From the stowed position, the AACB 100 is pivotable by the hinge 140 about the axis of rotation A to a deployed, or closed position, and the second door panel 110B is slid away from the first door panel 110A in the direction of extension E, along the expansion zone 120, until the AACB 100 has a width that is substantially similar to the width of the opening through the bulkhead 50 being obstructed, then the securing lock 130A and the expansion lock(s) 130B are engaged to prevent the width of the AACB 100 from being changed and to secure the AACB 100 across the opening in the bulkhead 50 to prevent passage therethrough.

While the first and second door panels 110A, 110B can fully overlap each other, as shown in FIGS. 4A and 4B, such that the AACB 100 is at its minimum width value for storage, there is a minimum amount by which the fingers 112A, 112B of the first and second door panels 110A, 110B must overlap each other (e.g., must be interleaved with each other) in order to ensure that the AACB 100 has sufficient structural rigidity to stop, or at least slow, passage through the opening in the bulkhead 50, without the AACB 100 collapsing due to an insufficient amount of the profile 116A being engaged within the recessed channel 116B at the closed, or deployed, position. It is advantageous to provide a stop or parking that prevents the second door panel 110B from sliding too far away from the first door panel 110A to structurally compromise the AACB 100 in the closed, or deployed, position.

The AACB 100 as disclosed herein advantageously is configured to provide traditional door functionality regarding how the AACB 100 is manipulated, stowed, and/or deployed by a flight crew, but yet allows for stowage in very tight constraints, where stowing a door of traditional construction would not be feasible, if not impossible. By virtue of its variable width, the AACB 100 provides a single barrier configuration that can readily be deployed at any of a plurality of widths to block openings through a bulkhead 50 corresponding to a variety of aisle widths, thereby reducing the number of different doors that must be designed, built, and stocked to meet the disparate requirements for different aircraft types and even different cabin configurations within a single aircraft type.

As noted elsewhere herein, the first and second door panels 110A, 110B are fixed to each other by tracks or other similar hardware on the upper and/or lower surfaces of their fingers 112A, 112B, these tracks allowing the first and second door panels 110A, 110B to move relative to each other within a limited range of motion, this limited range of motion being at least less than a length of the fingers 112A, 112B of the first and/or second door panels 110A, 110B. The sliding relative motion between the first and second door panels 110A, 110B is thus limited to a maximum opening dimension, corresponding to a maximum deployed width of the AACB 100. The first and second door panels 110A, 110B can be locked in all positions between fully closed and fully opened by a lock 130, such as an expansion lock 130B, which may be spring-loaded such that it will engage within a latching feature of a finger 112A, 112B to automatically lock and prevent the lock 130 from being accidentally disengaged. In some embodiments, a securing lock 130A may be provided to secure the AACB 100 within the opening through the bulkhead 50. The securing lock 130A and/or the expansion lock 130B may be actuatable by a handle in some embodiments. In some embodiments, the securing lock 130A and/or the expansion lock 130B may comprise a time-delay feature to delay the ability of unauthorized personnel to dislodge the AACB 100 from the closed, or deployed, position shown in FIG. 1, thereby providing the flight crew adequate time to react in the event of an unauthorized attempt to open the AACB 100.

In the retracted (minimum width) position, the AACB 100 can be rotated against the surface to which the hinge 140 is attached (e.g., a galley, lavatory, etc.) and may be fixed thereto for stowage.

It is understood that the example embodiments disclosed herein are not limiting and do not restrict the object disclosed herein. In particular, it will be evident to the person skilled in the art that the features described herein may be combined with each other arbitrarily, and/or various features may be omitted therefrom, without any resultant devices, systems, and/or methods deviating from the subject matter disclosed herein.

While at least one example embodiment of the present invention(s) is disclosed herein, it should be understood that modifications, substitutions and alternatives may be apparent to one of ordinary skill in the art and can be made without departing from the scope of this disclosure. This disclosure is intended to cover any adaptations or variations of the example embodiment(s). In addition, in this disclosure, the terms "comprise" or "comprising" do not exclude other elements or steps, the terms "a", "an" or "one" do not exclude a plural number, and the term "or" means either or both. Furthermore, characteristics or steps which have been described may also be used in combination with other characteristics or steps and in any order unless the disclosure or context suggests otherwise.

The invention claimed is:

1. An auxiliary access control barrier (AACB) for installation within an opening formed in a bulkhead within an aircraft fuselage, the AACB comprising:
   laterally extendable door panels that are slidably attached to each other to vary a width of the AACB;
   a hinge by which the door panels are pivotably attached to the bulkhead by one or more of the door panels, such that the door panels are pivotable between a deployed position, in which the door panels are positioned across the opening to prevent passage through the opening and in which the AACB has a first width, and a stowed position, in which the door panels are positioned to allow passage through the opening and in which the AACB has a second width, wherein the first width is greater than the second width; and
   one or more locks configured to prevent relative motion between the door panels to fix the width of the AACB and/or to secure the AACB within the opening in the bulkhead;
   wherein:
   the door panels comprise a first door panel and a second door panel;
   the first door panel comprises fingers that interlock with fingers of the second door panel in an alternating manner in a direction of a height of the AACB; and
   when the fingers of the second door panel slide in a lateral direction, orthogonal to the vertical direction, relative to the fingers of the first door panel to vary the width of the AACB, a first row of viewports are opened between adjacent fingers of the first door panel and a second row of viewports are opened between adjacent fingers of the second door panel.

2. The AACB of claim 1, wherein viewports of the first and second rows of viewports are configured such that events occurring on an opposite side of the AACB are observable through one or more of the viewports without moving the AACB from the deployed position.

3. The AACB of claim 1, wherein the fingers of the first door panel comprise a profile formed protruding out from upper and lower vertical surfaces thereof, the fingers of the second door panel comprise a recessed channel formed internal to upper and lower surfaces thereof, and wherein each recessed channel is configured such that a corresponding one of the profiles can be longitudinally inserted therein to secure the first and second door panels together.

4. The AACB of claim 1, wherein the first and second door panels comprise a minimum overlap distance necessary for maintaining structural rigidity of the AACB sufficient to resist passage through the opening, and wherein the AACB is laterally extendable between a minimum width and a maximum width, the maximum width corresponding to the minimum overlap distance.

5. The AACB of claim 4, wherein the one or more locks comprise an expansion lock recessed within one or more of the fingers of the second door panel, wherein an adjacent finger of the first door panel has a latch plate attached thereto, and wherein the expansion lock is configured to extend into the latch plate to prevent relative movement of the first door panel relative to the second door panel to fix the AACB at one of a plurality of widths between and including the minimum width and the maximum width.

6. A method of controlling access to an area within an aircraft fuselage, the method comprising:
   providing a bulkhead within the fuselage, the bulkhead having an opening formed therein; and
   attaching an auxiliary access control barrier (AACB) adjacent and/or within the opening of the bulkhead, the AACB comprising:
   laterally extendable door panels, wherein
   the door panels comprise a first door panel and a second door panel; and
   the first door panel comprises fingers that interlock with fingers of the second door panel in an alternating manner in a direction of a height of the AACB;

a hinge by which the door panels are pivotably attached within the opening of the bulkhead; and one or more locks;

sliding the fingers of the second door panel in a lateral direction, orthogonal to the vertical direction, relative to the fingers of the first door panel to vary a width of the AACB and to open a first row of viewports between adjacent fingers of the first door panel and a second row of viewports between adjacent fingers of the second door panel;

engaging the one or more locks to prevent relative motion between the door panels and fix the width of the AACB; and pivoting the AACB between and including a deployed position, in which the door panels are positioned across the opening to prevent passage through the opening and in which the AACB has a first width, and a stowed position, in which the door panels are positioned to allow passage through the opening and in which the AACB has a second width, wherein the first width is greater than the second width.

7. The method of claim 6, wherein viewports of the first and second rows of viewports are configured such that events occurring on an opposite side of the AACB are observable through one or more of the viewports without moving the AACB from the deployed position.

8. The method of claim 6, wherein the fingers of the first door panel comprise a profile formed protruding out from upper and lower vertical surfaces thereof, the fingers of the second door panel comprise a recessed channel formed internal to upper and lower surfaces thereof, and wherein each recessed channel is configured such that a corresponding one of the profiles can be longitudinally inserted therein to secure the first and second door panels together.

9. The method of claim 6, wherein the first and second door panels comprise a minimum overlap distance necessary for maintaining structural rigidity of the AACB sufficient to resist passage through the opening, and wherein the AACB is laterally extendable between a minimum width and a maximum width, the maximum width corresponding to the minimum overlap distance.

10. The method of claim 9, wherein the one or more locks comprise an expansion lock recessed within one or more of the fingers of the second door panel, wherein an adjacent finger of the first door panel has a latch plate attached thereto, and wherein the expansion lock extends into the latch plate to prevent relative movement of the first door panel relative to the second door panel to fix the AACB at one of a plurality of widths between and including the minimum width and the maximum width.

11. The method of claim 6, wherein the opening in the bulkhead of the aircraft fuselage is at a forward portion of the aircraft fuselage, within a passenger cabin of the aircraft fuselage and adjacent to a cockpit door, the AACB being installed within the opening to prevent unauthorized access to a cockpit of the aircraft from the passenger cabin.

12. An aircraft comprising:

an aircraft fuselage;

a bulkhead secured within the fuselage, the bulkhead having an opening formed therein; and at least one auxiliary access control barrier (AACB) adjacent to the opening of the bulkhead, the AACB comprising:

laterally extendable door panels that are slidably attached to each other to vary a width of the AACB;

a hinge by which the door panels are pivotably attached to the bulkhead by one or more of the door panels, such that the door panels are pivotable between a deployed position, in which the door panels are positioned across the opening to prevent passage through the opening and in which the AACB has a first width, and a stowed position, in which the door panels are positioned to allow passage through the opening and in which the AACB has a second width, wherein the first width is greater than the second width; and one or more locks configured to prevent relative motion between the door panels to fix the width of the AACB and/or to secure the AACB within the opening in the bulkhead;

wherein:

the door panels comprise a first door panel and a second door panel;

the first door panel comprises fingers that interlock with fingers of the second door panel in an alternating manner in a direction of a height of the AACB; and when the fingers of the second door panel slide in a lateral direction, orthogonal to the vertical direction, relative to the fingers of the first door panel to vary the width of the AACB, a first row of viewports are opened between adjacent fingers of the first door panel and a second row of viewports are opened between adjacent fingers of the second door panel.

13. The aircraft of claim 12, wherein viewports of the first and second rows of viewports are configured such that events occurring on an opposite side of the AACB are observable through one or more of the viewports without moving the AACB from the deployed position.

14. The aircraft of claim 12, wherein the fingers of the first door panel comprise a profile formed protruding out from upper and lower vertical surfaces thereof, the fingers of the second door panel comprise a recessed channel formed internal to upper and lower surfaces thereof, and wherein each recessed channel is configured such that a profile can be longitudinally inserted therein to secure the first and second door panels together.

15. The aircraft of claim 12, wherein the first and second door panels comprise a minimum overlap distance necessary for maintaining structural rigidity of the AACB sufficient to resist passage through the opening, and wherein the AACB is laterally extendable between a minimum width and a maximum width, the maximum width corresponding to the minimum overlap distance.

16. The aircraft of claim 15, wherein the one or more locks comprise an expansion lock recessed within one or more of the fingers of the second door panel, wherein an adjacent finger of the first door panel has a latch plate attached thereto, and wherein the expansion lock is configured to extend into the latch plate to prevent relative movement of the first door panel relative to the second door panel to fix the AACB at one of a plurality of widths between and including the minimum width and the maximum width.

17. The aircraft of claim 12, wherein the opening in the bulkhead of the aircraft fuselage is at a forward portion of the aircraft fuselage, within a passenger cabin of the aircraft fuselage and adjacent to a cockpit door, the AACB being installed within the opening to prevent unauthorized access to a cockpit of the aircraft from the passenger cabin.

* * * * *